United States Patent
Brieussel

(10) Patent No.: US 7,103,780 B1
(45) Date of Patent: Sep. 5, 2006

(54) CHIP CARD LOADABLE WITH COMPRESSED DATA

(75) Inventor: Benoît Brieussel, Aubagne (FR)

(73) Assignee: Gemplus, Gemenos Cedex (FR)

( * ) Notice: Subject to any disclaimer, the term of this patent is extended or adjusted under 35 U.S.C. 154(b) by 0 days.

(21) Appl. No.: 09/857,290

(22) PCT Filed: Nov. 4, 1999

(86) PCT No.: PCT/FR99/02694

§ 371 (c)(1),
(2), (4) Date: Aug. 8, 2001

(87) PCT Pub. No.: WO00/33266

PCT Pub. Date: Jun. 8, 2000

(30) Foreign Application Priority Data

Dec. 1, 1998 (FR) .................................. 98 15257

(51) Int. Cl.
*G06F 17/00* (2006.01)
(52) U.S. Cl. ...................... 713/193; 713/189; 713/192
(58) Field of Classification Search ................ 713/193, 713/189, 192
See application file for complete search history.

(56) References Cited

U.S. PATENT DOCUMENTS

| 5,499,293 A | 3/1996 | Behram et al. |
| 5,796,829 A | 8/1998 | Harding et al. |

FOREIGN PATENT DOCUMENTS

| FR | 2730330 | 8/1996 |
| FR | 2759795 | 8/1998 |

OTHER PUBLICATIONS

Marvle: a VLSI chip for variable length encoding and decoding; Mukherjee et al.; Computer Design: VLSI in Computers and Processors, 1992. ICCD '92. Proceedings., IEEE 1992 International Conference on Oct. 11-14, 1992, pp. 170-173.*
Code compression using variable-to-fixed coding based on arithmetic coding; Yuan Xie; Wolf, W.; Lekatsas, H.; Data Compression Conference, 2003. Proceedings. DCC 2003 Mar. 25-27, 2003, pp. 382-391.*
Decompression of test data using variable-length seed LFSRs; Zacharia, N.; Rajski, J.; Tyszer, J.; VLSI Test Symposium, 1995, Proceedings., 13th IEEE Apr. 30-May 3, 1995, pp. 426-433.*

* cited by examiner

*Primary Examiner*—David Jung
(74) *Attorney, Agent, or Firm*—Buchanan Ingersoll & Rooney PC

(57) ABSTRACT

The invention concerns a chip card receiving fields of compressed data encapsulated in frames including an indication of the expected length of decompressed data and a length of compressed data. The frames are received in a storage unit and the processor of the card decompresses each data field according to a decompression algorithm over a length based on the indication of the expected length and writes the decompressed data in another buffer storage unit. Several algorithms and optionally several decompression models are installed in the card storage unit, and a couple thereof is selected by the number read in the heading of each frame received.

19 Claims, 5 Drawing Sheets

CHIP CARD LOADABLE WITH COMPRESSED DATA

This disclosure is based upon, and claims priority from French Application No. 98/15257, filed on Dec. 1, 1998 and International Application No. PCT/FR99/02694, filed Nov. 4, 1999, which was published on Jun. 8, 2000 in a language other than English, the contents of which are incorporated herein by reference.

BACKGROUND OF THE INVENTION

The invention relates in general terms to the processing of data received in a chip card, also referred to as a microcomputer or microprocessor card (smart card).

The service providers managing chip cards have a greater and greater requirement to store a large number of data in the non-volatile memory of the EEPROM or Flash EEPROM type contained in the chip card. The memory capacity requirements of chip cards also have a tendency to increase because of the use of certain software packages written in programming languages, such as Java, for which parts of programs, such as applets, are to be downloaded into the cards.

In order to give an idea, if 5 kilobytes are transmitted in each of 1 million cards with a single terminal operating 24 hours a day and 7 days a week and whose output is 9600 bits/second, more than 2 months are needed to load these data into the cards.

In radiotelephony, the chip card is integrated as an SIM (Subscriber Identity Module) in the portable radiotelephone terminals. The active state of the radiotelephone terminal and therefore its current consumption and its battery life depend notably on the time taken to transmit the data to be processed by the SIM card.

In more general terms, the reduction in the time taken for transmission of the data to be downloaded into the chip cards is an indisputable gain vis-à-vis both the terminal loading the data into the chip card and vis-à-vis the card itself and the transmission support(s) or channel(s) conveying the data to be downloaded.

In addition the Japanese patent application 08235329 filed on 24 Feb. 1995 proposes downloading compressed data into a memory card, that is to say a "static" card which does not process the data which it receives and serves as a remote memory with respect to an image processing unit which produced the compressed data. The image processing unit writes to two first predetermined addresses in the memory card respectively the length of the data before compression and the length of the data after compression, and then writes the compressed data in the memory card. Conversely, when the compressed data are loaded from the memory card into the image processing unit, the image processing unit reads the length of the data before compression and the length of the data after compression at the respective two aforementioned addresses, and then reads the compressed data so as to decompress them in accordance with a predetermined decompression algorithm installed in the image processing unit.

SUMMARY OF THE INVENTION

The objective of the invention is to reduce the time taken for downloading the data into the chip cards, that is to say the microcomputer or microprocessor cards, by loading compressed data therein, whilst preserving the functionalities of the chip cards with regard to the processing of non-compressed data.

To this end, a chip card able to receive compressed data fields each preceded by an indication of the expected length of decompressed data and a length of compressed data, is characterised in that it comprises a first means for storing the received fields of compressed data according to the lengths of the respective compressed data, a second means for storing a decompression algorithm, a means for decompressing, according to the said decompression algorithm, the compressed data in each field and decompressed data over a length depending on the indication of length of decompressed data, and a third means for storing the decompressed data.

By virtue of the reception of data in the compressed state in the chip cards according to the invention, the time taken for loading 5 kilobytes into a million of these cards according to the aforementioned example is reduced by 10% to 40%, typically by 20%, giving a saving of approximately two weeks.

Preferably, the second storage means contains several decompression algorithms and the decompression means detects the number of a decompression algorithm preceding each received field of compressed data so that these are decompressed according to the decompression algorithm whose number has been detected. In a variant, the second storage means can comprise several decompression models respectively associated with the decompression algorithm, and the decompression means detects the number of a decompression model preceding each received field of compressed data so that these are decompressed according to the decompression algorithm and the corresponding decompression model whose numbers have been detected. The various decompression algorithms and decompression models installed in memory in the card enable the card to be used by any service provider managing the terminals or servers compressing data according to one of the algorithms and one of the models.

According to another characteristic of the invention, the chip card comprises a fourth means for storing a decompression model received previously to a received compressed data field, and the decompression means detects a number of a decompression algorithm preceding the said received field of compressed data so that these are decompressed according to the decompression algorithm whose number has been detected and the decompression model read in the fourth storage means.

According to another possibility, the decompression model is reconstructed in the RAM memory of the card; in this case, the fourth storage means stores a decompression model derived implicitly from a compressed data field during writing in the first storage means, and the decompression means detects the number of a decompression algorithm preceding the said stored field of compressed data so that these are decompressed according to the decompression algorithm whose number was detected and the derived decompression model read in the fourth storage means.

The decompression means can detect an indication on the compressed or non-compressed state of each received field of compressed data so that the decompression means decompresses the data only in the data fields preceded by an indication of compressed state.

The invention also relates to a protocol data unit for being received notably by the chip card according to the invention. The unit comprises a header and a data field, the header including the length of the data field, and is characterised in that the header comprises an indication on the expected length of decompressed data after decompression of the data field. This characteristic helps to decompress precisely, whatever the decompression algorithm selected.

The indication on the expected length of decompressed data is an n-bit word equal to the expected length of the decompressed data modulo 2', the expected length being expressed in m-bit words of decompressed data. The integer n is equal to at least 0, for example equal to 2, 3 or 4 bits according to the distribution of decompression parameters in a field of the protocol unit. The integer m is equal to at least 1, for example equal to 8 for words such as bytes.

When the card is of the multi service provider type, the header includes the number of a decompression algorithm by means of which the compressed data in the data field are to be decompressed, and may include the number of a decompression model which corresponds to the decompression algorithm whose number is included in the header and by means of which the compressed data in the data field are to be decompressed.

The card can receive compressed data and non-compressed data.

To this end, the header comprises a data state indication having a first state when the data in the data field are not compressed, and having a second state when the data in the data field are compressed. The data state indication can have a third state when the data in the data field are to be decompressed according to a predetermined decompression algorithm and a predetermined decompression model which can be chosen by default in the card; the indication on the expected length of decompressed data is then not always necessary for decompression and may not be in the protocol data unit. In the contrary case, the header comprises the number of a decompression algorithm, the number of a decompression model and an indication on the expected length of decompressed data when the data state indication is at the second state.

Finally, the invention also relates to a method for decompressing compressed data fields to be implemented notably in the chip card according to the invention. Each compressed data field is preceded by an indication on the length of non-compressed data corresponding to compressed data contained in the field and a length of compressed data contained in the field. The method is characterised by the following steps:

detecting the length of compressed data and storing the compressed data field over the detected length, and detecting the indication of the expected length of decompressed data and decompressing the data so as to stop the decompression according to the detected indication.

The method can comprise, for a multi service provider application, a step of selecting a decompression algorithm amongst several decompression algorithms according to the number of an algorithm preceding the compressed data field in order to decompress the data in the field following the selected decompression algorithm, and where applicable a step of selecting a decompression model amongst several decompression models associated with the decompression algorithm selected according to the number of a model preceding the compressed data field in order to decompress the data in the field according to the selected decompression algorithm and the selected decompression model.

In place of the step of selecting a decompression model, the method can comprise a step of storing a decompression model received previously to the compressed data field in order to decompress the data in the field according to the selected decompression algorithm and the stored decompression model, or a step of storing a decompression model derived implicitly from the received compressed data field in order to decompress the data in the field according to the decompression algorithm selected and the decompression model derived and stored.

The method can also comprise a step of detecting a state indication for data preceding each decompressed data field in order to decompress the data in the field only when the data state indication is not at a first predetermined state.

Preferably, the step of detecting an indication on the expected length of decompressed data is to be performed only when the data state indication is at a predetermined state indicating that the compressed data are to be decompressed according to a predetermined algorithm and model, selected by default in the card.

BRIEF DESCRIPTION OF THE DRAWINGS

Other characteristics and advantages of the present invention will emerge more clearly from a reading of the following description of several preferred embodiments of the invention with reference to the corresponding accompanying drawings, in which.

DETAILED DESCRIPTION

Figure 1:
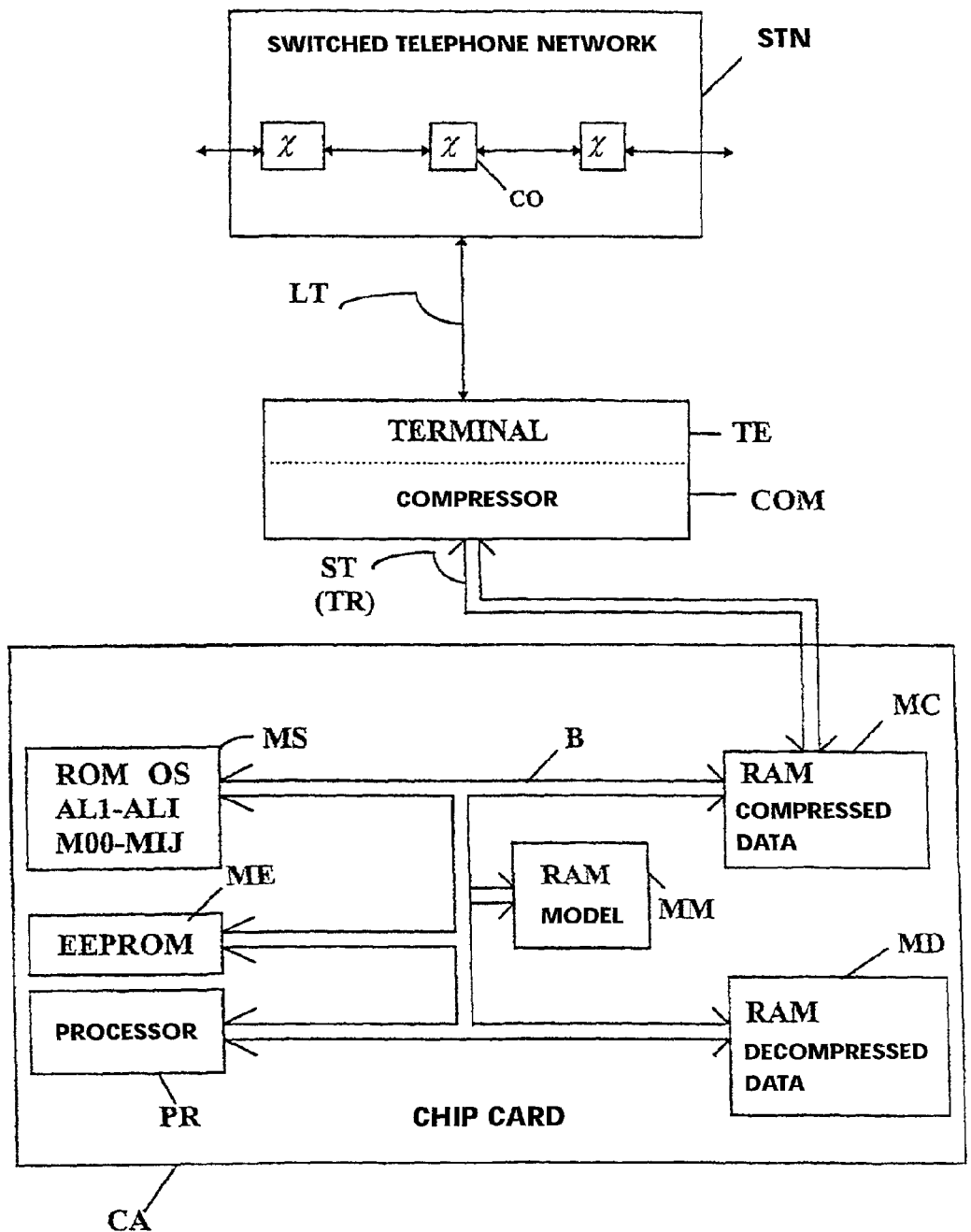
FIG. 1 is a block diagram of a system for transmission between a chip card according to the invention and a terminal with a data compressor according to a first embodiment.

According to a first embodiment shown in FIG. 1, a card reader terminal TE comprises a data compressor COM for compressing data which it has processed internally, whether or not the terminal is self-contained, or which it has received from a transmission line, for example a subscriber telephone line LT served by a unit automatic exchange CO in the switched telephone network STN or an integrated service digital network ISDN. The compressed data are transmitted in frames TR according to the invention by the terminal to a chip card CA through a transmission medium ST of the cable transmission line or radio type or of the electrical, magnetic or inductive contact type for example. The chip card decompresses according to the invention the compressed data included in the received frames TR.

Schematically the chip in the card comprises a RAM memory MC for storing the received frames with compressed or non-compressed data, a RAM memory MD for storing the decompressed data, a ROM memory MS including the operating system OS (operating system) of the card and specific applications notably according to the invention a EEPROM memory ME for storing notably data transmission/reception protocols, confidential information and decompressed and non-decompressed data, and a microprocessor PR connected to the memories by a bus B.

Figure 2:
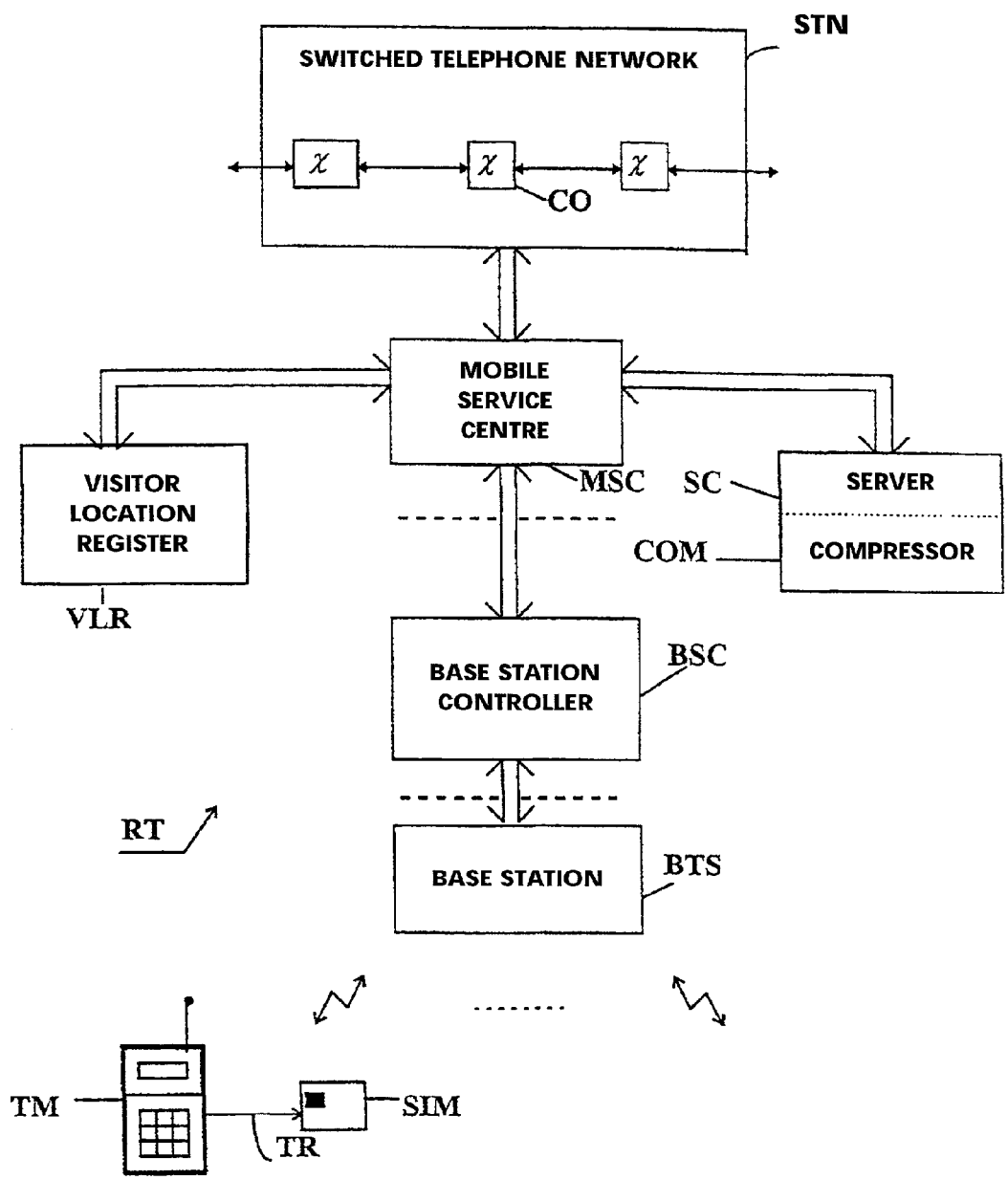
FIG. 2 is a block diagram of a radiotelephony system between a chip card according to the invention and a server with a data compressor according to a second embodiment.

According to a second embodiment shown in FIG. 2, the card terminal is a mobile radiotelephony terminal TM in a cellular radiotelephony network RT, for example of the GSM 900 or DCS 1800 type. The memory card is a SIM card, that is to say a subscriber identity module with an architecture similar to the card CA shown in FIG. 2 and substantially modified and supplemented according to the invention. In order not to overload the mobile terminal TM with software, the latter does not compress the data which it receives in order to transmit them to the SIM card but receives these data already compressed through the traffic channel allocated from the corresponding base station.

In the network RT shown in FIG. 2, only the main entities through which the data intended for the SIM card pass are shown. These entities are a mobile service centre MSC connected to at least one group switching centre CO in the switched telephone network STN and managing communications for visiting mobile terminals, including the terminal TM, which are at a given moment situated in a respective location area; a visitor location register VLR connected to the centre MSC and containing characteristics of the mobile terminals, in fact of the SIM cards, in this location area; a base station controller BSC managing notably the allocation of channels to mobile terminals, the power of base station(s) and intercell transfers for mobile stations; and the base station BTS covering the radio cell in which the terminal TM is situated at the given time.

In this second embodiment, the data compressor COM is included in a compression server SC which is connected to the mobile service centre MSC through a conventional ISDN interface, for example of the T2 2048 kilobits/second type with 30 B information channels and one 64 kilobit/second D channel. All the incoming data to be compressed intended for the mobile terminals situated in the said location area for any communications with fixed terminals in the network STN or the mobile terminals in the radiotelephone network RT are compressed in the server SC before passing through the corresponding controller BSC, base station BTS and mobile terminal TM.

In a variant, the server SC is not connected to the mobile service centre MSC, but is replaced by compressor servers connected respectively to the base station controllers BSC served by the centre MSC.

Figure 3:
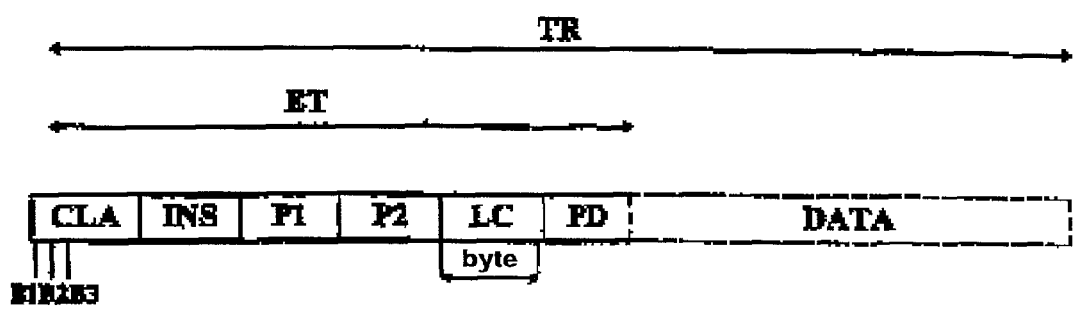
FIG. 3 is a diagram showing a compressed data frame according to the invention.
Figure 4:
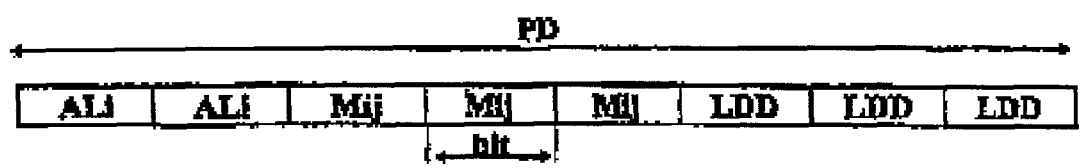
FIG. 4 is a diagram of a decompression parameter field included in the frame of FIG. 3.

Referring now to FIGS. 3 and 4, a protocol data unit in the form of a frame of compressed data TR to be transmitted from the terminal TE, TM to the card CA, SIM through the transmission medium ST, or from the compression server SC through notably the terminal TM according to FIG. 2, has a structure with a header ET and a data field DATA. The frame TR is substantially modified compared with a standard frame of incoming data according to the character by character asynchronous transmission protocol "T=0". Instead of five bytes, the header ET of the frame TR comprises five bytes CLA, INS, P1, P2 and LC as in a "T=0" frame and a sixth byte PD containing decompression parameters according to the invention, "taken" from the data field. These six bytes are in hexadecimal code.

As in the "T=0" frame, the byte CLA designates a class of the instruction contained in the following byte, the byte INS an instruction related to a command of the operating system OS (operating system) of the chip card CA, SIM or related to the security of data for example, the bytes P1 and P2 parameters of the instruction, and the byte LC the length of the data field in the "T=0" frame expressed in bytes and equal, for the majority of compressed data frames according to the invention, to the length of the field DATA of the frame TR increased by 1 due to the byte PD.

According to the invention, the frame TR contains two data state indication bits B2 and B3, the second and the third in the byte CLA, which are produced in the compressor COM of the terminal TE or of the server SC in order to indicate principally the compressed or non-compressed state of the data in the field DATA. The data state indication bits B2 and B3 have the following respective binary states:

"00" when the data are received non-compressed, the frame TR then being a "T=0" frame with the byte PD as a data byte;

"10" when the data are received compressed and are to be decompressed in the card according to predetermined compression algorithm AL0 and model M00, the most commonly used, selected by default in the chip card CA, SIM, the frame TR then being a "T=0" frame when the length of the decompressed data is not necessary for decompression; and "11" when the data are received compressed and are to be decompressed in the card according to a selected one ALi amongst several decompression algorithms and a selected one Mij amongst several decompression models adapted to the selected algorithm ALi, the decompression algorithm and model ALi and Mij corresponding to the compression algorithm and model "ALi" and "Mij" used in the terminal TE or the server SC for initially compressing in the data.

Thus, according to the invention, the ROM memory MS of the chip card, which contains mainly the operating system OS of the card, also contains several applications relating to decompression algorithms AL0 to ALi with the index i between 0 and an integer I typically equal to no more than 3, each algorithm ALi being associated with several respective compression models Mi0 to Mij with the index j between 0 and an integer J typically equal to no more than 7. A decompression model provides a match between the compressed symbols and the non-compressed symbols by means of the decompression algorithm which implements it; for example, a model is based on a tree, a probabilistic table, a dictionary or a list. The identification of the algorithm ALi and the identification of the model Mij serving to decompress the data DATA are indicated to the card CA, SIM respectively by a 2-bit word and a 3-bit word at the start of the decompression parameter byte PD, as shown in FIG. 4, when the bits B2 and B3 in the class field CLA are "11". The card CA, SIM of the invention is thus adapted to various decompression algorithms which are respectively chosen by various service providers responsible for the management of sets of terminals TE, or sets of terminals TM with servers SC.

As a variant, the chip card CA (FIG. 1), SIM also comprises a RAM memory MM connected to the bus B. Characteristics of a decompression model which are included in incoming command frames (non-compressed) preceding the frames TR with compressed data according to this model, are transmitted by the terminal TE or the server SC through the medium ST and are written in the memory MM by the processor PR. The algorithm implementing this model entered in memory MM will then be sought in the memory MS by the processor in order to decompress the data.

According to another variant, amongst the algorithms AL0 to ALi, some of them are associated with decompression models whose characteristics are not stored in advance in the ROM memory MS of the card CA, SIM. Such a decompression model is reconstructed by means of the corresponding decompression algorithm in the processor PR along with the writing of the compressed data frame in the memory MC, and is written in the RAM memory MM in order to read it during the decompression of the compressed data. The decompression model is, according to this variant, contained implicitly in the compressed data frame.

The decompression parameter field PD in a compressed data frame contains a last n-bit word LDD which indicates to the card CA, SIM the extracted length of the decompressed data modulo $2^n$, where n is an integer greater than or equal to 2. The data which are initially non-compressed in the terminal TE or the server SC to which the decompressed data in the card CA, SIM correspond are processed as m-bit data words, m being an integer greater than or equal to 1. The expected length of the data is expressed as m-bit data words, and the word LDD indicates the number of data words in the last field with no more than $2^n$ data words in the frame which have been compressed. According to the embodiment illustrated in FIG. 4, the integer n is equal to 3, in general greater than or equal to 0, the m-bit words are bytes of decompressed data with m=8, and the word of expected length of the decompressed data LDD contains 3 bits and is equal to the remainder of the division of the expected length of decompressed data by $2^n=8$.

By means of the decompressed data length parameter LDD, the processor PR in the chip card CA, SIM stops the decompression of the data just at the end of the received data to be decompressed. For example, according to certain decompression algorithms, such as an algorithm of the Huffman type, several symbols can be coded in an m-bit word, in this case one byte for m=8. The decompression of the symbols must stop at the end of the decompressed frame, which can occur at the first symbol at the start of the last byte; the following bits at the end of this byte are not data but stuffing bits which are introduced into the card after having precisely counted the number of bits of the decompressed data in accordance with the precision indicated by the parameter LDD in parallel with the compressed data length LC.

According to another variant, the precision of the decompressed data length may attain one bit, when m=1; for example, for n=8, the parameter LDD indicates the number of data bits expected in the last byte included in the frame.

The parameter LDD is also useful when several "T=0" frames, or standard frames of incoming data in accordance with the "T=1" block by block asynchronous transmission protocol, known as application protocol data units APDU, must be concatenated in order to constitute a file. The start of a frame must follow on precisely from the end of the previous frame, that is to say the last byte of decompressed data. This file segmentation at the last byte of the previous frame is indicated precisely by the parameter LDD.

Instead of the expected length being expressed by the remainder of the division by $2^l$ it could be introduced completely into the header of the frame TR according to the invention. However, this introduction would add an additional word in the header ET of the frame TR, the expected length then being able to be greater than $2^8=256$ bytes. In addition a third bit would be necessary in the class field CLA in order to give all cases.

Figure 5:
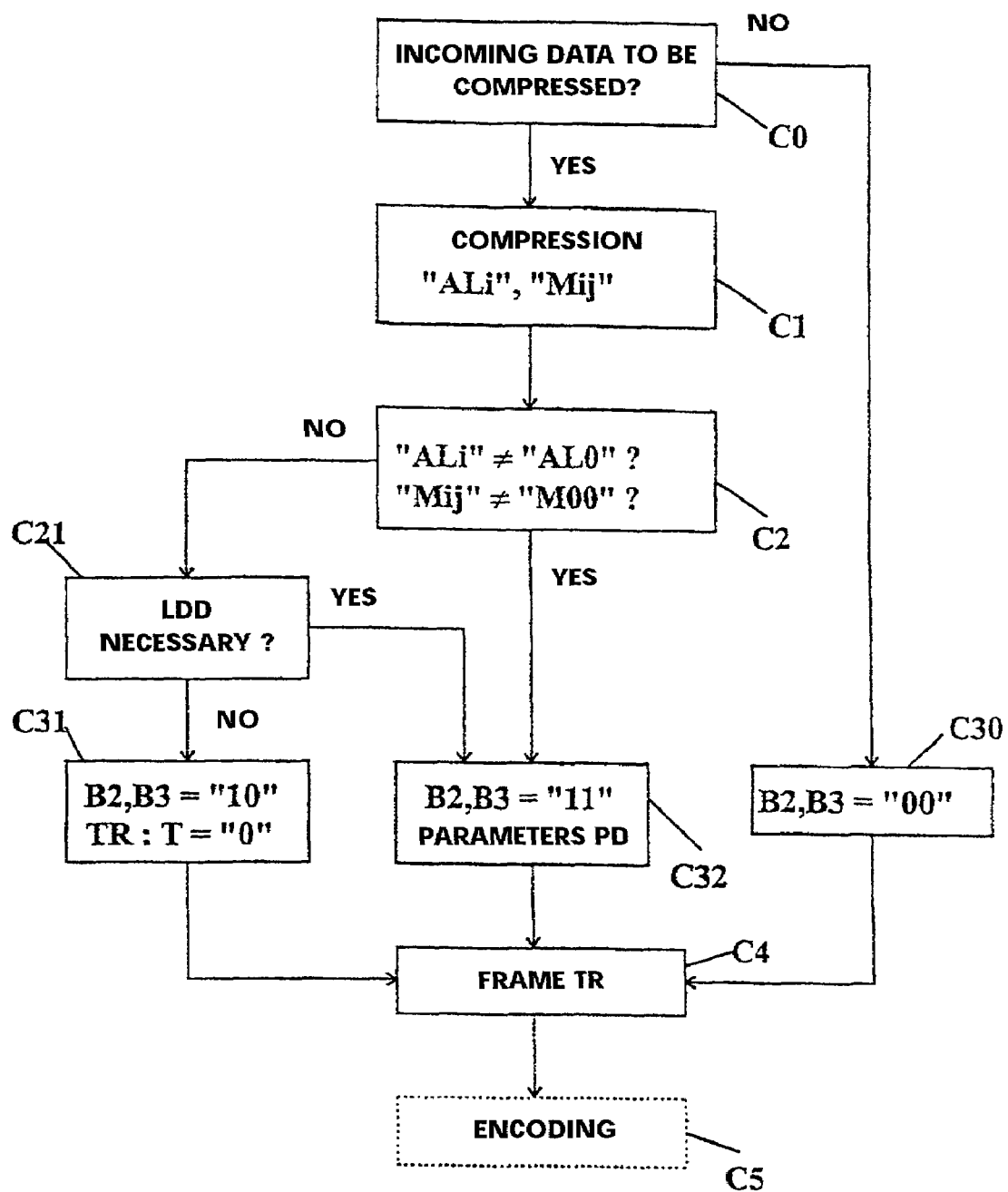
FIG. 5 is an algorithm of a data compression method according to the invention.

A compression method in accordance with the invention is shown in FIG. 5. It comprises mainly five steps C0 to C4 performed in the terminal TE or the server SC.

When, in accordance with protocol instructions at step C0, the data incoming into the terminal T or the server SC are not compressed, the bits B2 and B3 are set to the state "00" at a step C30 following on from an initial step C0.

If the incoming data are to be compressed at step C0, the terminal TE or the server SC compresses the incoming data at the following step C1 in accordance with a compression algorithm "ALi" and a corresponding compression model "Mij" preinstalled in the terminal TE or the server SC. If the algorithm "ALi" and the module "Mij" are the predetermined compression algorithm "AL0" and the predetermined compression model "M00" and if the decompression does not make it necessary at step C21 to know the indication on the decompressed data length LDD in so far as the compression has stopped on an integer number of n-bit data words, the bits B2 and B3 are set respectively to the state "10" at step C31. In the contrary cases, at steps C2 and C21, the parameter LDD is necessary, and the bits B2 and B3 are set to the state "11" at step C32. The decompression parameter field PD is formed with the number ALi and Mij of the algorithm and model which serve for compression of the data and with the expected length of the data before compression, modulo 2.

Then, at the following step C4, whether the data are compressed or not compressed, the frame TR to be transmitted is finally formed. Optionally, the whole of the frame, or only the data field DATA, is encoded at a step C5.

Figure 6:
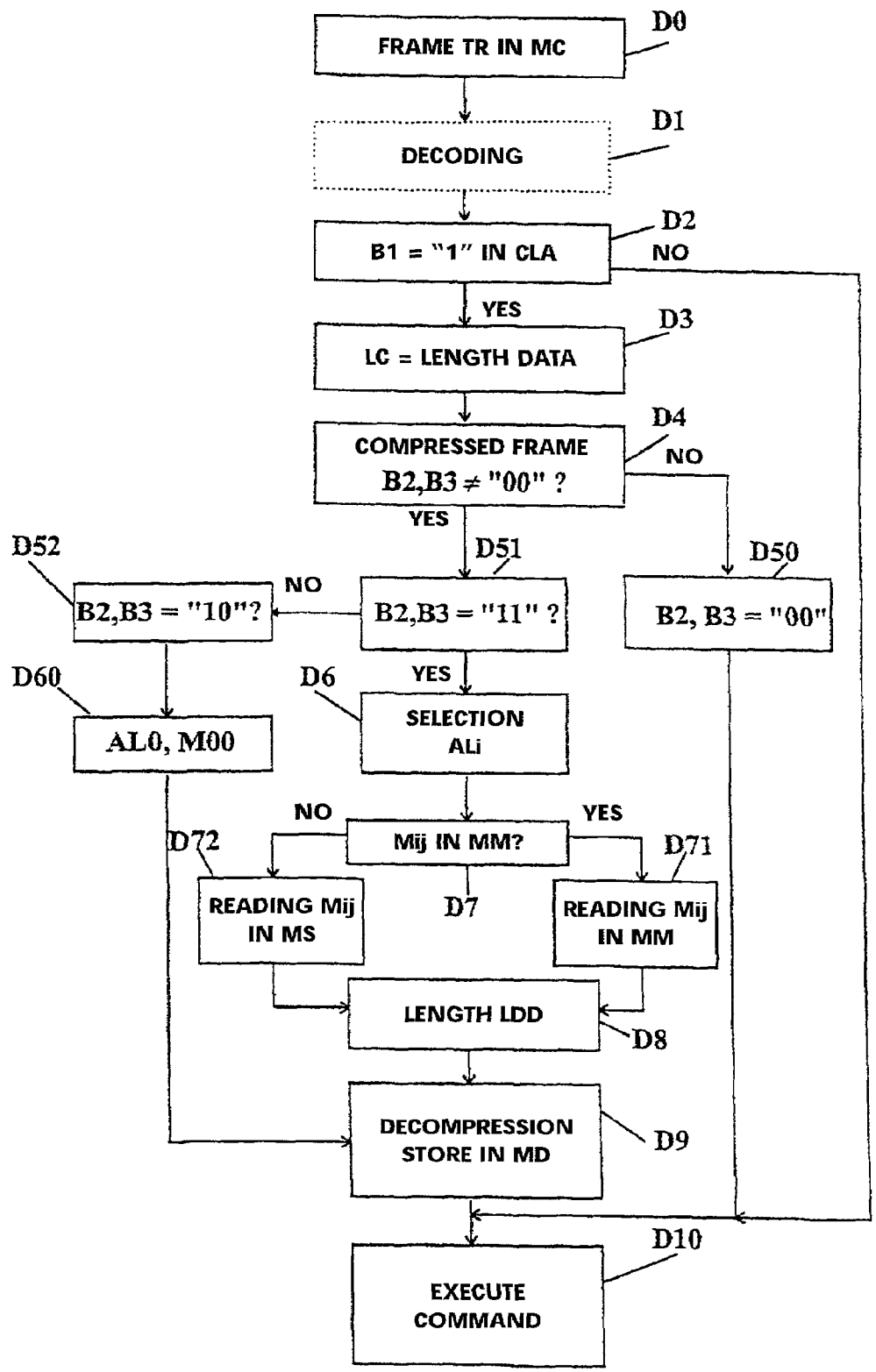
FIG. 6 is an algorithm of a data compression method according to the invention.

As shown in FIG. 6, the data decompression in the card PC, SIM comprises nine steps D0 to D10. At the initial step D0, the frame TR received according to an asynchronous transmission is written in the RAM buffer memory MC in the card. Optionally, if the frames TR or the data DATA included in this frame have been encoded in the terminal TE or the server SC, the card processor PR executes a deciphering of each frame received and written in the RAM buffer memory at step D1. The processor PR next validates, at step D2, the received frame TR as a standard frame when the most significant bit B1 in the field of class CLA is at the "1" state; otherwise, when the frame is received with B1="0", the method passes from step D2 to step D10. The length of the data field DATA read in the field LC at step D3 fixes the stoppage of the writing of the data in the memory MC.

At the following step D4, the second and third bits B2 and B3 in the field CLA of the received frame TR are read. If these two bits are equal to "00", as indicated at step D50, no data decompression is executed and the method passes directly to the last step D10. In the contrary case, the data DATA must be decompressed and the method passes to step D51 in order to distinguish the frames without and with a decompression parameter field PD.

If at step D51 the bits B2 and B3 are not respectively equal to "11", they are equal to "10" at step D52. The operating system OS automatically selects the predetermined decompression algorithm and model AL0 and M00 in the memory MS at step D60, and then executes the decompression of the data DATA and writes the decompressed data in the memory MD at step D9. The end of the decompression is estimated according to the length LC of the fields DATA.

When the bits B2 and B3 are respectively "11" at step D51, the operating system OS will select the decompression algorithm and model. The decompression algorithm ALi indicated by the first two bits of the decompression parameter field PD included in the received frame TR is selected in the ROM memory MS of the card at step D6. The corresponding decompression model Mij is read in the RAM memory MM at steps D7 and D71, if the characteristics of the model Mij were previously received on reception of the frame TR or implicitly deduced at the start of the reception of the frame TR. In the contrary case, the three model bits in the field PD of the received frame are read in order to select the model Mij in the ROM memory MS at steps D7 and D72. Then, after step D71 or D72, the n-bit word LDD at the end of the decompression parameter field PD is read at step D8 by the operating system OS so that, at step D9, the processor PR executes the decompression of the data contained in the field DATA of the received frame TR and stops this decompression according notably to the word LDD read previously. The decompressed data are written as and when in the RAM memory MD.

According to the instruction contained in the field INS and the parameters P1, P2 specifying this instruction in the received frame TR, the operating system OS at step D10 executes a given command, such as for example the copying of the decompressed data contained in the memory MD into the EEPROM memory of the card, at a given file address. At this stage, the operating system in the card is exactly in the situation which it would encounter in a standard card, if the received data had not been compressed according to the invention.

By way of example, the header ET contained in a compressed data frame TR is as follows:

CLA="E8"; INS="D0"; P1="03"; P2="20"; LC="23" and PD="B6", all these bytes being in hexadecimal code.

In this example, the first half of the field CLA is equal to "1110", that is to say B2="1" and B3="1", which means that the data DATA have been compressed with an algorithm and a model other than the algorithm "AL0" and the model "M00". According to the field LC, the data DATA after compression extend over (16×2+3)=35 bytes. The decompression is effected according to the algorithm AL2 and the corresponding model M26, whose numbers are read in the first five bits "10110" of the decompression parameter field PD. The expected length of the decompressed data LDD contains an integer number of groups of 8 bytes+3 bytes according to the last three bits LDD="011" of the field PD of the frame TR.

In the other transmission direction, from the card CA, SIM to the terminal TE, TM, the data are not initially compressed and are encapsulated by the card in standard frames "T=0", or possibly "T=1".

What is claimed is:

1. A chip card that receives compressed data fields each preceded by an indication of the expected length of decompressed data and a length of compressed data, comprising a first memory for storing the received fields of compressed data according to the lengths of the respective compressed data, a second memory for storing a decompression algorithm, a processor for decompressing, according to said decompression algorithm, the compressed data in each field into decompressed data over a length depending on the indication of length of decompressed data, and a third memory for storing the decompressed data.

2. A chip card according to claim 1, in which the second memory contains several decompression algorithms, and the processor detects a decompression algorithm number preceding each received field of compressed data so that the compressed data is decompressed in accordance with the decompression algorithm whose number has been detected.

3. A chip card according to claim 2, in which the second memory comprises several decompression models respectively associated with the decompression algorithms, and the processor detects a decompression model number preceding each received field of compressed data so that the compressed data is decompressed in accordance with the corresponding decompression algorithm and decompression model whose numbers have been detected.

4. A chip card according to claim 2, comprising a fourth memory for storing a decompression model received previously to a received compressed data field, and wherein said processor detects the number of a decompression algorithm preceding said received field of compressed data so that the compressed data is decompressed according to the decompression algorithm whose number has been detected and the decompression model stored in the fourth memory.

5. A chip card according to claim 2, comprising a fourth memory for storing a decompression model implicitly deduced from a compressed data field during writing in the first memory, and the processor detects the number of a decompression algorithm preceding said stored field of compressed data so that the compressed data is decompressed according to the decompression algorithm whose number was detected and the derived decompression model stored in the fourth memory.

6. A chip card according to claim 1, wherein said processor detects an indication of the compressed or non-compressed state of each received data field so that the processor decompresses the data only in the data fields preceded by an indication of a compressed state.

7. A protocol data unit for a chip card that receives compressed data fields, comprising a header and a data field, the header including the length of the data field and an indication of the expected decompressed data length after decompression of the data field, wherein the indication of the expected decompressed data length is an n-bit word equal to the expected length of the decompressed data modulo $2^n$, the expected length being expressed in decompressed m-bit data words, with n being an integer equal to at least 0 and m being an integer equal to at least 1.

8. A protocol data unit according to claim 7, in which the header includes a data state indication having a first state when the data in the data field are not compressed, and having a second state when the data in the data field are compressed.

9. A protocol data unit according to claim 7, in which the header further includes the number of a decompression algorithm by means of which the data compressed in the data field is to be decompressed.

10. A protocol data unit for a chip card that receives compressed data fields, comprising a header and a data field, the header including the length of the data field, an indication of the expected decompressed data length after decompression of the data field, the number of a decompression algorithm by means of which the data compressed in the data field is to be decompressed, and the number of a decompression model which corresponds to the decompression algorithm whose number is included in the header and by means of which the compressed data in the data field is to be decompressed.

11. A protocol data unit for a chip card that receives compressed data fields, comprising a header and a data field, the header including the length of the data field, an indication of the expected decompressed data length after decompression of the data field, and a data state indication having a first state when the data n the data field are not compressed, a second state when the data in the data field are compressed, and a third state when the data in the data field are to be decompressed in accordance with a predetermined decompression algorithm and a predetermined decompression model.

12. A protocol data unit for a chip card that receives compressed data fields, comprising a header and a data field, the header including the length of the data field, a data state indication having a first state when the data in the data field are not compressed and a second state when the data in the data field are compressed, the number of a decompression algorithm, the number of a decompression model and the indication of the expected decompressed data length after decompression of the data field when the data state indication is at the second state.

13. A method for decompressing compressed data fields in a chip card, each compressed data field being preceded by an indication of the expected decompressed data length corresponding to compressed data contained in the field and by a length of the compressed data contained in the field, comprising the following steps:
   detecting the length of the compressed data and storing the compressed data field over the detected length, and
   detecting the indication of the expected decompressed data length and decompressing the data so as to stop the decompression according to the detected indication.

14. A method according to claim 13, further including the steps of selecting a decompression algorithm amongst several decompression algorithms according to the number of an algorithm preceding the compressed data field, and decompressing the data in the field in accordance with the selected decompression algorithm.

15. A method according to claim 14, further including the steps of selecting a decompression model amongst several decompression models associated with the selected decompression algorithm according to the number of a model preceding the compressed data field, and compressing the data in the field in accordance with the decompression algorithm selected and the decompression model selected.

16. A method according to claim 14, further including the steps of storing a decompression model received previously in the compressed data field, and decompressing the data in the field in accordance with the selected decompression algorithm and the stored decompression model.

17. A method according to claim 14, further including the steps of storing a decompression model deduced implicitly from the received compressed data field, and decompressing the data in the field in accordance with the selected decompression algorithm and the deduced and stored decompression model.

18. A method according to claim 13, further including the step of detecting a data state indication preceding each received data field in order to decompress the data in the field only when the data state indication is not at a first predetermined state.

19. A method according to claim 18, wherein the step of detecting an indication of the expected decompressed data length is not performed when the data state indication is at a predetermined state indicating that the compressed data are to be decompressed according to a predetermined algorithm and model.

* * * * *